(12) United States Patent
Beardsley et al.

(10) Patent No.: US 7,866,142 B2
(45) Date of Patent: Jan. 11, 2011

(54) AEROENGINE THRUST REVERSER

(75) Inventors: Peter K Beardsley, Derby (GB); Glenn A Knight, Derby (GB)

(73) Assignee: Rolls-Royce plc, London (GB)

( * ) Notice: Subject to any disclaimer, the term of this patent is extended or adjusted under 35 U.S.C. 154(b) by 952 days.

(21) Appl. No.: 11/797,444

(22) Filed: Apr. 3, 2007

(65) Prior Publication Data
US 2008/0072571 A1 Mar. 27, 2008

(30) Foreign Application Priority Data
May 6, 2006 (GB) .................................. 0608985.8

(51) Int. Cl.
F02K 3/02 (2006.01)
(52) U.S. Cl. .................. 60/226.2; 60/230; 239/265.25; 244/110 B
(58) Field of Classification Search ............... 60/226.2, 60/230; 239/265.25, 265.29; 244/110 B
See application file for complete search history.

(56) References Cited

U.S. PATENT DOCUMENTS

| | | | |
|---|---|---|---|
| 3,262,268 A * | 7/1966 | Beavers ...................... 60/226.2 |
| 3,500,645 A * | 3/1970 | Hom ........................... 60/229 |
| 3,541,794 A * | 11/1970 | Bollenbacher et al. ..... 60/226.2 |
| 3,603,090 A * | 9/1971 | Billinger et al. ............. 60/226.2 |
| 3,703,258 A * | 11/1972 | Wildner .................. 239/265.29 |
| 3,736,750 A * | 6/1973 | Britt ........................... 60/226.2 |
| 3,779,010 A * | 12/1973 | Chamay et al. ............. 60/226.2 |
| 3,829,020 A * | 8/1974 | Stearns .................. 239/265.13 |
| 3,875,742 A * | 4/1975 | McMurtry et al. ......... 60/226.2 |
| 4,145,877 A * | 3/1979 | Montgomery ............... 60/226.2 |
| 4,183,478 A * | 1/1980 | Rudolph .................. 244/110 B |
| 4,373,328 A * | 2/1983 | Jones ........................ 60/226.2 |
| 4,501,393 A * | 2/1985 | Klees et al. ............. 239/265.13 |
| 4,527,391 A * | 7/1985 | Marx et al. ................. 60/226.2 |
| 4,545,199 A * | 10/1985 | Sankey et al. .............. 60/226.2 |
| 4,564,160 A * | 1/1986 | Vermilye ................ 244/110 B |
| 4,731,991 A * | 3/1988 | Newton ...................... 60/226.2 |
| 4,807,434 A * | 2/1989 | Jurich ........................ 60/226.2 |
| 4,823,547 A * | 4/1989 | Newton ...................... 60/226.2 |
| 4,922,713 A * | 5/1990 | Barbarin et al. ............ 60/226.2 |
| 5,493,856 A * | 2/1996 | Newton ...................... 60/226.2 |
| 5,507,143 A * | 4/1996 | Luttgeharm et al. ........ 60/226.2 |
| 5,655,360 A * | 8/1997 | Butler ........................ 60/226.2 |
| 5,706,649 A * | 1/1998 | Robinson et al. ........... 60/226.2 |
| 5,778,659 A * | 7/1998 | Duesler et al. ............. 60/226.1 |
| 5,799,903 A * | 9/1998 | Vauchel .................. 244/110 B |
| 5,806,302 A * | 9/1998 | Cariola et al. ................. 60/204 |
| 6,021,636 A * | 2/2000 | Johnson et al. ............. 60/226.2 |
| 6,151,883 A * | 11/2000 | Hatrick et al. ............. 60/226.2 |
| 6,170,253 B1 * | 1/2001 | Newton ...................... 60/226.2 |
| 6,286,784 B1 * | 9/2001 | Hardy et al. ............. 244/110 B |
| 7,484,356 B1 * | 2/2009 | Lair ........................... 60/226.2 |
| 2007/0234707 A1 | 10/2007 | Beardsley |
| 2009/0151320 A1 * | 6/2009 | Sternberger ................ 60/226.2 |

* cited by examiner

Primary Examiner—William H Rodríguez
(74) Attorney, Agent, or Firm—Jeffrey S. Melcher; Manelli Denison & Selter PLLC

(57) ABSTRACT

A gas turbine engine comprising a core engine a fan and a fan casing surrounding the fan and extending rearwardly to attach to an array of outlet guide vanes characterised in that a cascade is rigidly attached to the fan casing and is connected to the core engine via a second support.

15 Claims, 4 Drawing Sheets

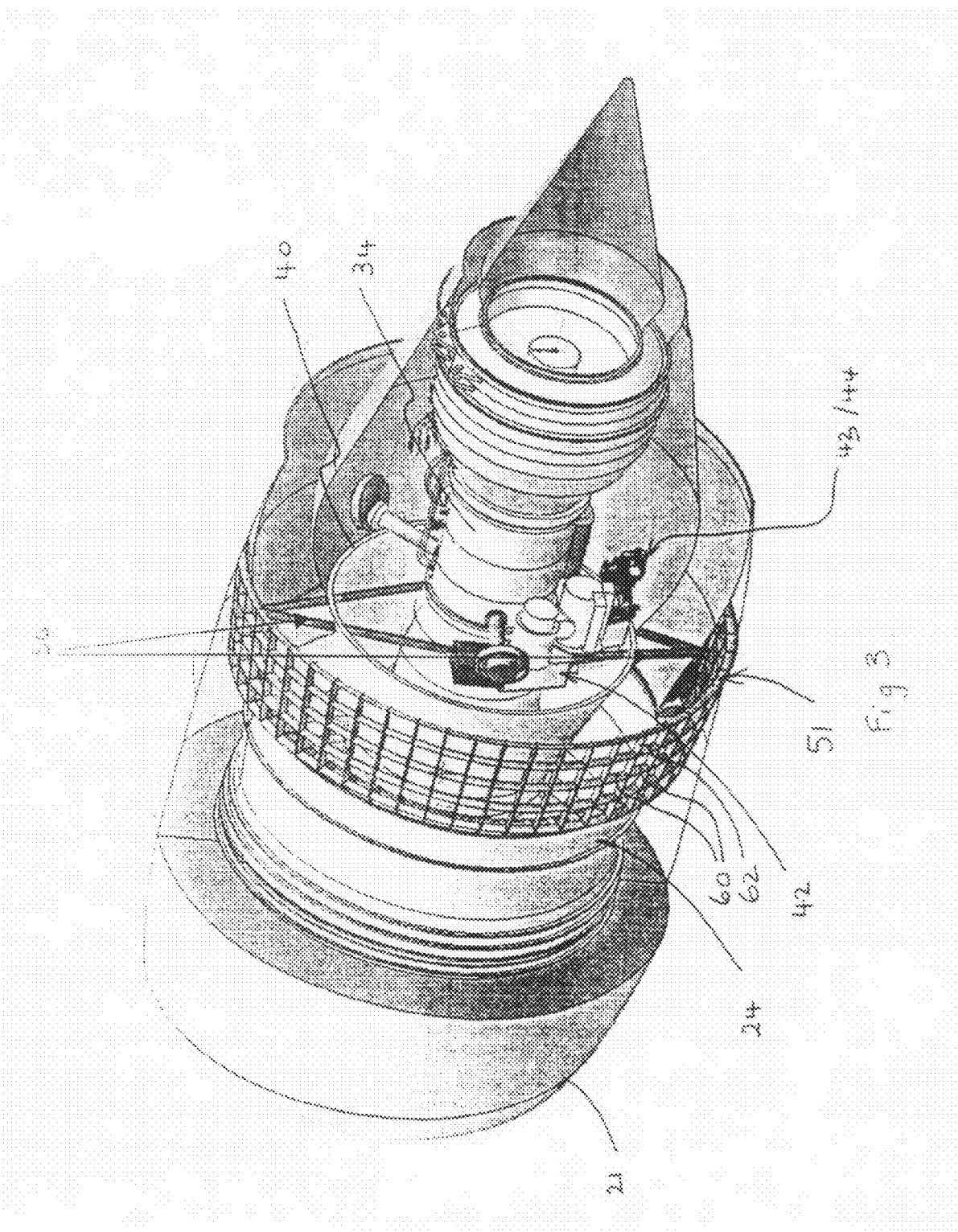

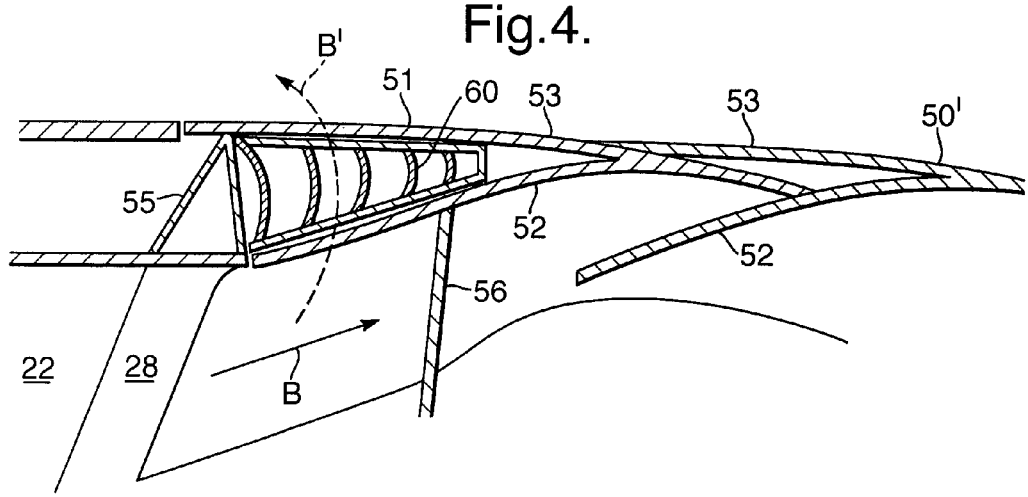
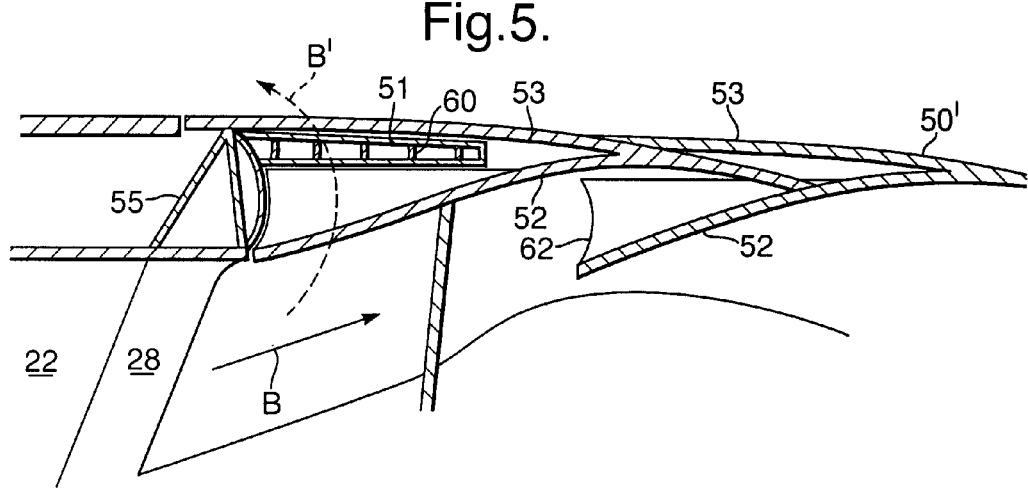

AEROENGINE THRUST REVERSER

CROSS-REFERENCE TO RELATED APPLICATIONS

This application claims priority to GB 0608985.8, filed 6 May 2006.

BACKGROUND OF THE INVENTION

The present invention relates to a thrust reverser for a gas turbine engine and in particular a thrust reverser in combination with a fan casing for reducing nacelle and pylon lengths.

Some conventional turbo fan engines have accessories, such as a gearbox, mounted on a rear fan casing and within a surrounding nacelle. The nacelle comprises a thrust reverser unit, which includes an array of cascade boxes, and a bypass exhaust nozzle. The cascade boxes are mounted rearwardly of the rear fan casing and together with a translating cowl of the thrust reverser, mean the nacelle is particularly long. In turn a pylon, attaching the engine to the aircraft, is required to extend a long way forward to support the engine particularly at its front mounting point. One conventional front mount is located on the fan casing adjacent an array of outlet guide vanes, themselves position forward of the rear fan casing. As well as the outlet guide vanes supporting the fan casing a pair of A-frames spans between the rear fan casing and a core engine.

The axial position of this conventional thrust reverser unit is determined by the rear fan casing configuration, which is itself determined by (a) the size and number of engine accessories (e.g. gearbox and generator), (b) the position of the gearbox's radial drive and (c) a required location for the A-frames to attach to and react loads onto a suitably rigid core engine structure.

Since the axial location of the bypass exhaust nozzle is critical to engine placement on an aircraft's wing, this conventional engine is relatively far forward. This results in a long pylon with associated high over hung engine loads, increased weight and aerodynamic drag penalties of a long nacelle.

Therefore it is an object of the present invention to reduce the lengths of both the pylon and the nacelle in order to obviate the above mentioned disadvantages.

SUMMARY OF THE INVENTION

In accordance with the present invention a gas turbine engine comprises a gas turbine engine comprising a core engine a fan and a fan casing surrounding the fan and extending rearwardly to attach to an array of outlet guide vanes characterised in that a cascade is rigidly attached to the fan casing and is connected to the core engine via a second support.

Preferably, the second support is an A-frame and at least two A-frames are provided, one positioned at each of the top and bottom of the engine. Each A-frame comprises an apex attached to the cascade and its two ends attached to the core casing. Preferably, each A-frame is attached to the core casing adjacent an array of vanes.

Alternatively, the second support is an array of spokes and preferably the spokes are vanes.

Preferably, the cascade is annular and capable of carrying hoop stress.

Preferably, the rigid attachment is by virtue of the fan casing and cascade being a unitary structure.

Alternatively, the cascade is rigidly attached to the fan casing by any one of the group comprising a bolted or a welded joint.

Preferably, the cascade is rigidly attached to the fan casing via a ramp fairing.

Preferably, the cascade is further rigidly attached to the fan casing via a torque box.

Preferably, the cascade is positioned between inner and outer translatable cowls in a stowed position and is exposed to an airflow when the translatable cowls are in a deployed position.

Alternatively, the cascade is positioned in a radially outward part of a space between inner and outer cowls.

Alternatively, the cascade extends substantially from adjacent the inner cowl to adjacent the outer cowl.

Preferably, the core casing is surrounded by a core fairing and engine accessories are mounted between the core casing and the core fairing.

BRIEF DESCRIPTION OF THE DRAWINGS

The present invention will be more fully described by way of example with reference to the accompanying drawings in which:

FIG. 3 is a cut away view of the rear of a turbo fan engine in accordance with the present invention;

FIG. 4 is a cut away view showing a further embodiment of a thrust reverser cascade in accordance with the present invention; and FIG. 5 is a cut away view showing yet a further embodiment of a thrust reverser cascade in accordance with the present invention.

DETAILED DESCRIPTION OF THE INVENTION

Figure 1:
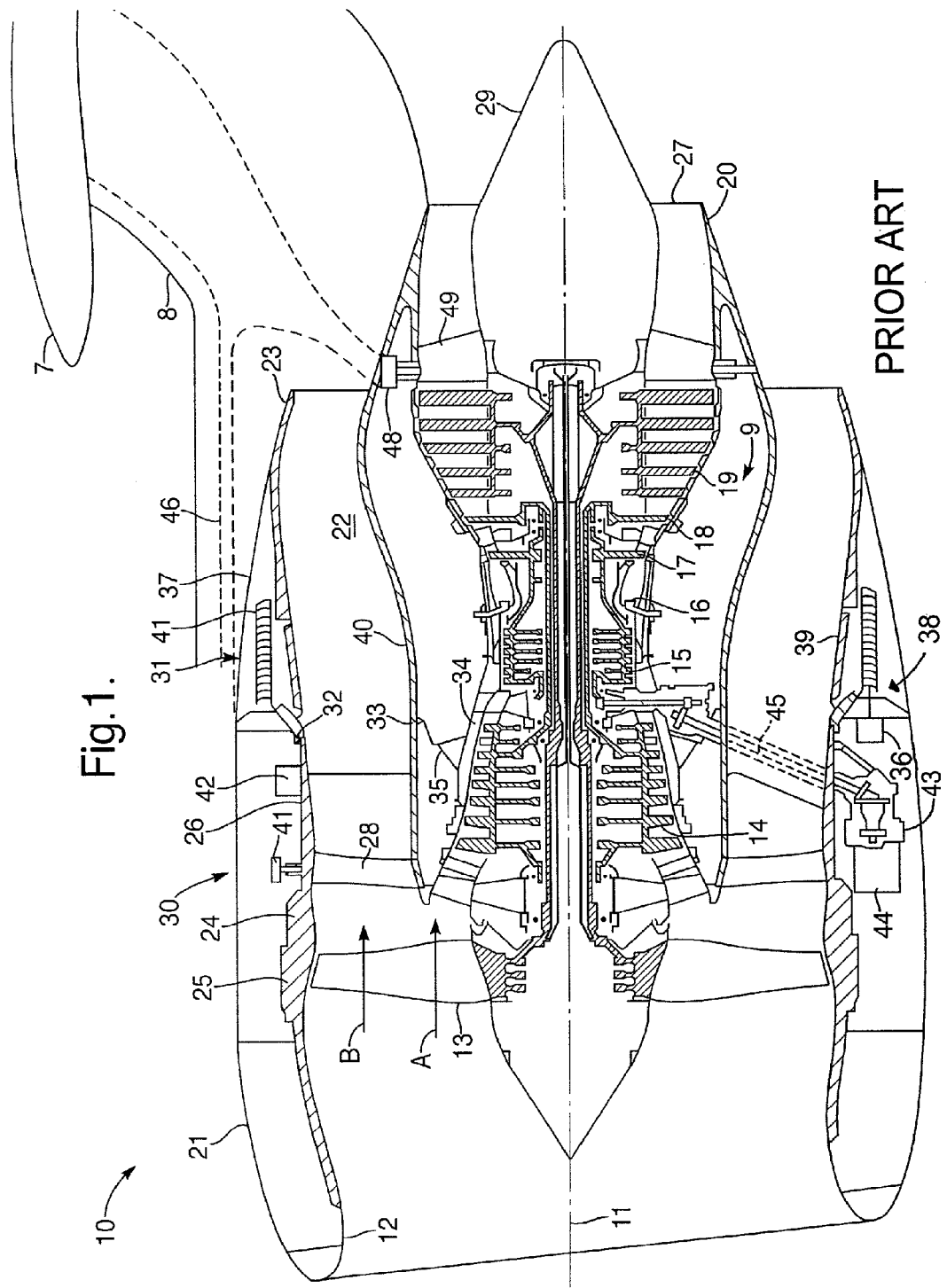
FIG. 1 is a schematic section of a ducted fan gas turbine engine incorporating a conventional thrust reverser unit.

Referring to FIG. 1, a ducted fan gas turbine engine generally indicated at 10 has a principal and rotational axis 11. The engine 10 comprises a propulsive fan 13 and a core engine 9 having, in axial flow series, an air intake 12, an intermediate pressure compressor 14, a high-pressure compressor 15, combustion equipment 16, a high-pressure turbine 17, an intermediate pressure turbine 18, a low-pressure turbine 19 and terminating with a core exhaust nozzle 20. A nacelle 21 generally surrounds the engine 10 and defines the intake 12, a bypass duct 22 and an exhaust nozzle 23.

The gas turbine engine 10 works in the conventional manner so that air entering the intake 12 is accelerated by the fan 13 to produce two air flows: a first airflow A into the intermediate pressure compressor 14 and a second airflow B which passes through a bypass duct 22 to provide propulsive thrust. The intermediate pressure compressor 14 compresses the airflow A directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan 13 by suitable interconnecting shafts.

A centre-plug 29 is positioned within the core exhaust nozzle 20 to provide a form for the core gas flow A to expand against and to smooth its flow from the core engine. The centre-plug 29 extends rearward of the core nozzle's exit plane 27.

The fan 13 is circumferentially surrounded by a structural member in the form of a fan casing 24, which is supported by an annular array of outlet guide vanes 28. The fan casing 24 comprises a rigid containment casing 25 and attached rearwardly thereto is a rear fan casing 26.

This conventional turbo fan engine 10, having separate bypass and core engine exhaust nozzles 20, 23, is installed under an aircraft's wing 7 via a pylon 8. The nacelle 21 comprises two C-shaped openable doors 30, each comprising two C-shaped thrust reverser units 31, and are hinged from the aircraft's pylon 8. The two C-shaped thrust reverser units 31 are also attached to the engine via one or two sets of V-shaped groove/blades fixtures 32, 33 that extend around part of the nacelle and engine.

The thrust reverser units (TRU) 31 are attached to the rear fancase 26 and the core engine's casing 34 via a stiff triangular structure 35. The TRU 31 comprises a number of discreet cascade boxes 36, a translating cowl 37, a translating system 38 (including an actuator and sliders), a blocking door mechanism 39, an inner fixed structure or core fairing 40 and a C-shaped bypass duct opening system (including hinges, latches and power opening system). The TRU 31 is normally split into left and right C-shaped ducts to enable engine removal and core engine 9 maintenance access. Hinges are defined on the pylon 8 towards the top of the C-shaped ducts and latches are defined to provide hoop continuity at the bottom of the nacelle 21 between the two C-shaped ducts.

Each cascade box 36 attaches to a stiffening ring 41 at its aft end to provide structural support. A cascade box 36 comprises an array of airflow turning vanes mounted within a frame. The cascade boxes 36 only carry aerodynamic loads when the thrust reverser is deployed. The rear fancase 26 provides space for fancase mounted accessories 42 (e.g. a gearbox 43) and a load path to give axial separation between the outlet guide vane array (OGV) 28 and two A-frames (not shown in figure) at 3 and 9 O'clock positions.

The axial position of this conventional thrust reverser unit 31 is determined by length of the rear fancase 26, which is itself determined by (a) the size of the accessories 42 (e.g. generator 44 driven off the fan case mounted accessory gearbox 43), (b) the position of the gearbox' radial drive 45 (which needs to be sufficiently aft of the OGV's 28 and forward of the outer V-groove 32) and (c) the A-frames need to react loads onto suitably strong core engine structure, in this case the intercase 34 or triangular structure 35.

On all engine, but particularly on smaller three shaft engines, the length of the rear fancase 26 is disproportionately long relative to the overall length of the engine 10 and so the thrust reverser unit 31 is located considerably aft of a fan 13 which means the nacelle 21 also has substantial axial length.

A pylon structure 46 extends forwardly from the wing 7 to a front mount 41 situated on the fan casing 24 adjacent the OGV array 28. A rear mount 48 is positioned on the core engine casing 34 adjacent a tail bearing housing 49 situated downstream of the low pressure compressor 19. Since the axial location of the bypass duct's nozzle 23, which is formed at the aft end of the TRU 31, is critical to engine placement on and relative to the wing 7, the engine 10 is positioned substantially forward resulting in a relatively long pylon structure 46. This prior art arrangement is therefore disadvantaged by its high over hung engine and aerodynamic loads, weight and aerodynamic drag penalties of the nacelle.

Figure 2:
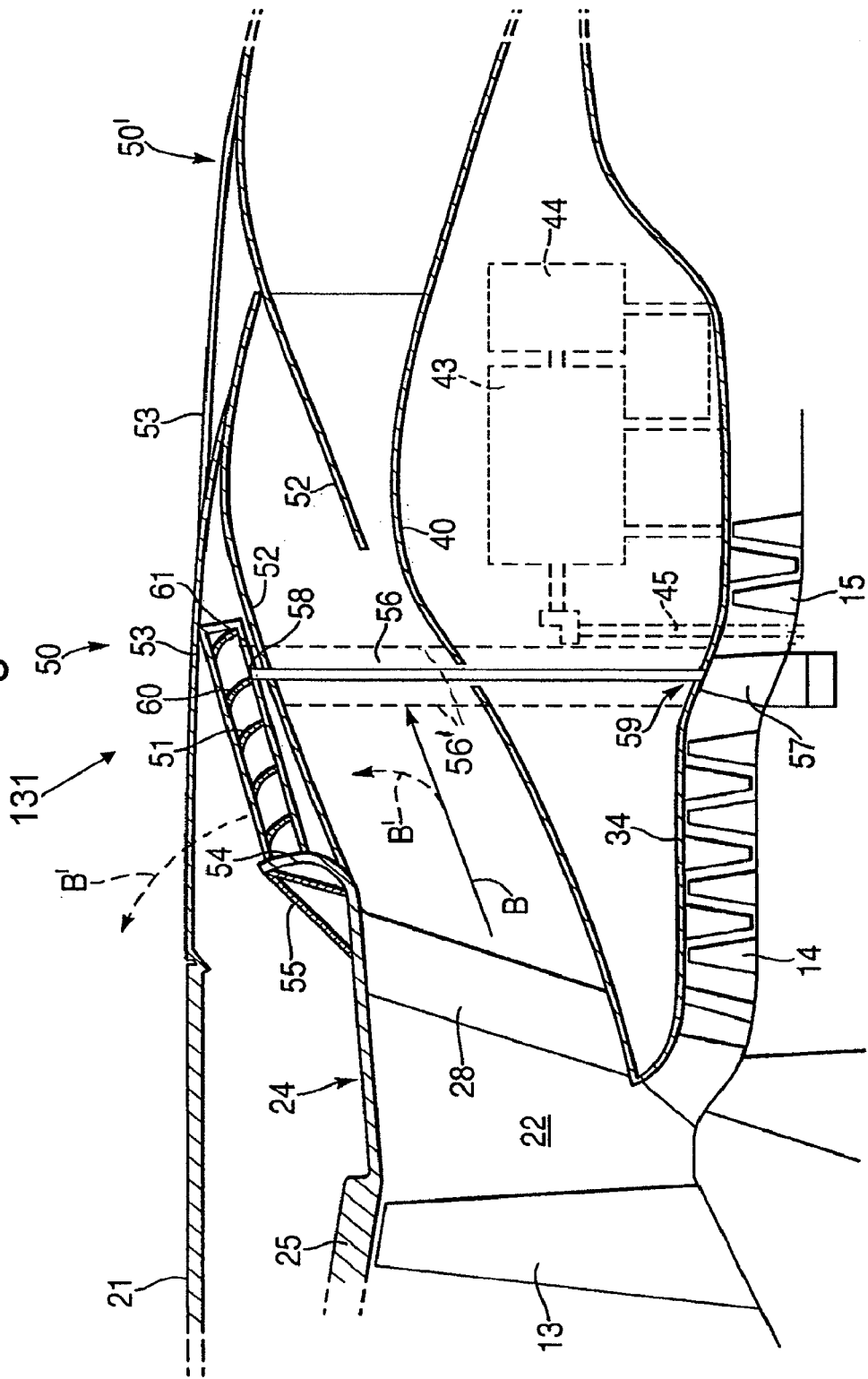
FIG. 2 is a schematic section of part of a ducted fan gas turbine engine incorporating a thrust reverser unit in accordance with the present invention.

Referring to FIGS. 2 and 3, where the reference numerals indicate like parts as in FIG. 1, it can be seen that the rear fan casing 26 of the prior art engine 10 is omitted. In omitting the rear fan casing 26, the accessories 42 (notably the gearbox 43 and generator 44 shown dashed as they would normally be located in the lower part of the engine) are now mounted between the core engine casing 34 and the core fairing 40.

A thrust reverser unit 31 in accordance with the present invention comprises a cascade 51 attached to the fan casing 24 and inner and outer translating cowls 52, 53. A conventional translating mechanism (38) is provided to drive the translating cowls 52, 53 between a stowed position 50 and a deployed position 50'. Typically the translating mechanism comprises two actuators, on each side of the engine, connected to the translating cowls 52, 53. Cowl sliders for guiding the translating cowls 52, 53 are provided the top and bottom of the nacelle 21, in a similar manner to a conventional TRU. The translating cowls 52, 53 are each part of C-shaped ducts (not shown) that are openable in conventional manner via hinges positioned at the top of the engine 10 or on the pylon 8.

In the deployed position 50' the bypass air flow B, B' is blocked and is diverted through the exposed cascade 51 which turns the air even further forwardly to provide reverse thrust. This type of thrust reverser unit 31, having no conventional blocker doors that swing across and block the bypass duct 22, is advantageously possible by virtue of the core fairing 40 extending further radially outwardly to accommodate the now core mounted accessories 42. Reference is made to the Applicant's co-pending UK application for a patent GB0606982.7 for the same advantages of having a TRU with no bypass duct blocker doors.

The cascade 51 is rigidly attached to the fan casing 24, adjacent the stiff OGV array 28, via a ramp fairing 54, which is aerodynamically shaped to provide smooth airflow into the cascade 51 during reverse thrust operation. A stiff torque box 55 is secured to an outer part of the ramp fairing 54 from the fan casing 24. The fan casing 24, torque box 55, ramp fairing 54 and cascade box 51 are all bolted together, however, they may also be welded together. Alternatively, the cascade 51 may be a unitary member with the fan casing 24.

The fan casing 24 must be rigidly supported so that it can transfer aerodynamic loads from the inlet 12 as well as other engine loads such as those encountered during thrust reversing. As well as the support provided by the array of OGVs 28, a second support 56 is provided and which spans between the core casing 34 and the cascade 51. In this exemplary embodiment the second support is a pair of A-frames 56 one positioned at the top or 12 O'clock position and the other is positioned at the bottom or 6 O'clock position of the engine 10. The A-frames 56 are positioned at the top and bottom of the engine, where there is space between ends of the C-shaped ducts, and which positioning advantageously does not interfere with the translating cowls 52, 53.

The apex 58 of each A-frame 56 is attached to the cascade 51 while the two ends 59 are spaced apart on the core casing 34 adjacent an array of vanes 57 or other stiff structure. This part of the core casing 34 is sometimes referred to as an intercase and is typically the part between the intermediate and high pressure compressors 14, 15.

Although the A-frame supports are a preferred embodiment, the second support 56 may comprise an array of spokes that are preferably configured as aerodynamic vanes 51' (shown dashed in FIG. 2). The vanes 56' may be arcuate to further direct bypass airflow. The vanes 56' may also be arranged such that they have a tangential angle. This tangential angle provides additional bracing for engine torque loads. Preferably there are four vanes 56' and therefore the inner cowl 52 is in four circumferential segments.

In accordance with the present invention, the cascade 51 is an annular structure and is therefore inherently stiff. Although preferably a monolithic annular structure, the cascade 51 may be fabricated from a number of circumferential segments bolted or welded together. It should be appreciated that the cascade 51 carries substantial hoop stresses as well as axial, vertical and torque loads. The cascade 51 comprises an array of airflow turning vanes 60 mounted within a stiff frame 61. Stiffenning ribs 62, as shown in FIG. 3, separate each axial row of vanes 60.

In the FIG. 4 embodiment, the cascade 51 is a particularly deep structure extending between the inner cowl 52 and outer cowl 53. Preferably, the cascade 51 extends substantially from adjacent the inner cowl 52 to adjacent the outer cowl 53. The torque box 55 is shown as attaching to the radially outermost part of the cascade 51, but may be attached part way along the radial depth of the cascade 51. This cascade 51 is advantaged as it provides greater turning for the diverted bypass airflow B' and improved stopping distance of the aircraft. This cascade also is particularly rigid by virtue of its deeper section thickness.

In the FIG. 5 embodiment, the cascade 51 is positioned in a radially outward part of the space between inner and outer cowls 52, 53. This enables the translating inner cowl 52 to comprise a blocker member 62 for improved diversion of the bypass airflow B through the cascade 51.

Access to the core engine 9 and the accessories 42 is achieved by deploying the thrust reverser unit 31, at its deployed position 50', and rotating open the translating cowls 52, 53. The core fairing 40, which is hinged independently, is then rotated open. Alternatively, individual access panels may be provided and readily removed.

By providing a structurally stiff cascade 51 and rigidly connecting it to the core casing 34 the rear fan casing (26) is omitted and consequently the length of the nacelle 21 is advantageously reduced. It should be noted that engine 10 and inlet 12 loads are not carried by conventional cascade structures. Further advantages that are apparent include reducing the overall cost and weight of the nacelle 21, which in turn reduces aerodynamic drag and improves fuel efficiency. These improvements also lead to further weight and drag reductions by virtue of reducing the length of the pylon's structure and profile.

In an alternative embodiment of the present invention, a TRU including bypass duct blocker doors is provided and one such design is described in the Applicant's co-pending UK application for a patent GB0606982.7.

We claim:

1. A gas turbine engine comprising:
    a core engine;
    a fan; and
    a fan casing surrounding the fan and extending rearwardly to attach to an array of outlet guide vanes, wherein a cascade is rigidly attached to the fan casing and is connected to the core engine via a second support, and wherein the second support is a frame having an A shape.

2. A gas turbine engine as claimed in claim 1 wherein each frame comprises an apex attached to the cascade and two ends attached to the core casing.

3. A gas turbine engine as claimed in claim 1 wherein each frame is attached to the core casing adjacent an array of vanes.

4. A gas turbine engine as claimed in claim 1 wherein the second support is an array of spokes.

5. A gas turbine engine as claimed in claim 1 wherein the cascade is annular and capable of carrying hoop stress.

6. A gas turbine engine as claimed in claim 1 wherein the rigid attachment is by virtue of the fan casing and cascade being a unitary structure.

7. A gas turbine engine as claimed in claim 1 wherein the cascade is rigidly attached to the fan casing by any one of the group comprising a bolted or a welded joint.

8. A gas turbine engine as claimed in claim 1 wherein the cascade is rigidly attached to the fan casing via a ramp fairing.

9. A gas turbine engine as claimed in claim 1 wherein the cascade is positioned between inner and outer translatable cowls in a stowed position and is exposed to an airflow B when the translatable cowls are in a deployed position.

10. A gas turbine engine as claimed in claim 9 wherein the cascade is positioned in a radially outward part of a space between inner and outer cowls.

11. A gas turbine engine as claimed in claim 9 wherein the cascade extends substantially from adjacent the inner cowl to adjacent the outer cowl.

12. A gas turbine engine comprising:
    a core engine;
    a fan; and
    a fan casing surrounding the fan and extending rearwardly to attach to an array of outlet guide vanes, wherein a cascade is rigidly attached to the fan casing and is connected to the core engine via a second support, and wherein the second support comprises at least two frames having an A shape, one positioned at each of the top and bottom of the engine.

13. A gas turbine engine comprising:
    a core engine;
    a fan; and
    a fan casing surrounding the fan and extending rearwardly to attach to an array of outlet guide vanes, wherein a cascade is rigidly attached to the fan casing and is connected to the core engine via a second support, and wherein the second support is an array of spokes, and wherein the spokes are vanes.

14. A gas turbine engine comprising:
    a core engine;
    a fan; and
    a fan casing surrounding the fan and extending rearwardly to attach to an array of outlet guide vanes, wherein a cascade is rigidly attached to the fan casing and is connected to the core engine via a second support, and wherein the cascade is further rigidly attached to the fan casing via a torque box.

15. A gas turbine engine comprising:
    a core engine;
    a fan; and
    a fan casing surrounding the fan and extending rearwardly to attach to an array of outlet guide vanes, wherein a cascade is rigidly attached to the fan casing and is connected to the core engine via a second support, and wherein the core casing is surrounded by a core fairing and engine accessories are mounted between the core casing and the core fairing.

* * * * *